United States Patent [19]

Clough

[11] 4,108,763

[45] Aug. 22, 1978

[54] CONTINUOUS TREATMENT OF LIQUID EFFLUENT AND SEWAGE

[75] Inventor: George Francis Gilbert Clough, Macclesfield, England

[73] Assignee: Imperial Chemical Industries Limited, London, England

[21] Appl. No.: 800,854

[22] Filed: May 26, 1977

[30] Foreign Application Priority Data

Jun. 8, 1976 [GB] United Kingdom .............. 23604/76

[51] Int. Cl.² .............................. C02C 1/08; B01F 3/04
[52] U.S. Cl. .................................. 210/14; 210/63 R; 210/195 S; 210/202; 261/83
[58] Field of Search .................... 210/7, 14, 15, 63 R, 210/188, 195 S, 200–202, 205, 209, 218, 256, 258; 261/83

[56] References Cited

U.S. PATENT DOCUMENTS

| 3,179,333 | 4/1965 | Claridge | 261/83 |
| 3,507,479 | 4/1970 | Pearl | 261/83 |
| 3,939,067 | 2/1976 | Huisman | 210/7 |

Primary Examiner—Thomas G. Wyse
Attorney, Agent, or Firm—Cushman, Darby & Cushman

[57] ABSTRACT

A method and apparatus for treating liquid sewage as effluent with oxygen-containing gas. The liquid is circulated firstly through a tubular compression coil which is rotated about a vertical axis, and secondly through a tubular decompression coil which is also rotated about a vertical axis. The oxygen-containing gas is supplied to the liquid as it passes through the compression coil.

7 Claims, 4 Drawing Figures

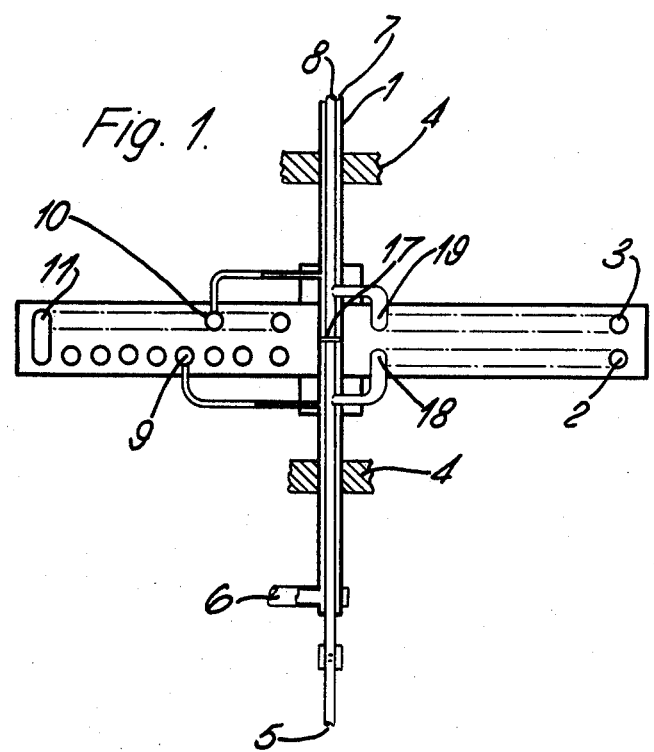
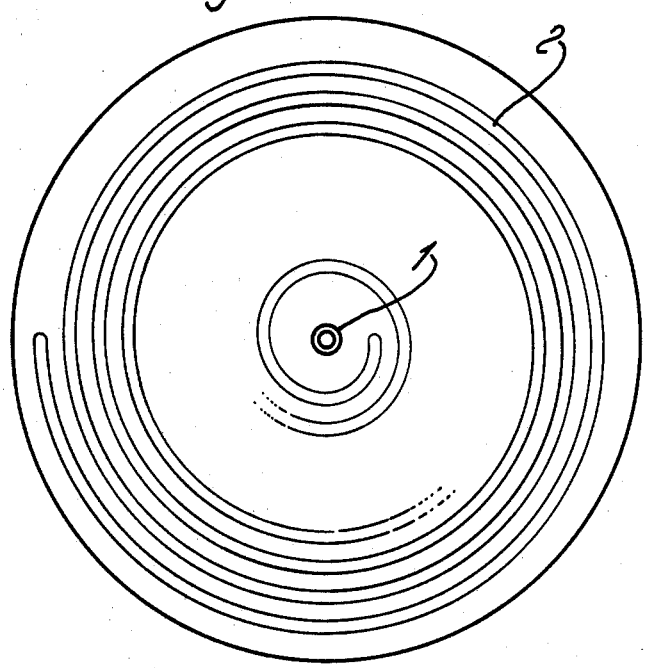

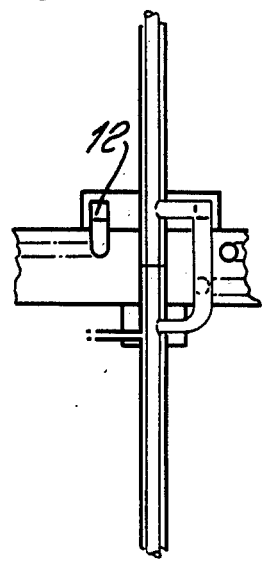
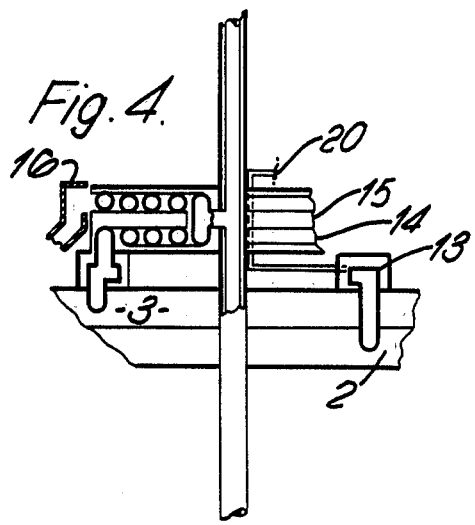

CONTINUOUS TREATMENT OF LIQUID EFFLUENT AND SEWAGE

This invention relates to a method and apparatus for the treatment of liquid-borne sewage and effluent including all types of biologically degradable domestic and industrial waste materials for example domestic waste, effluents produced by farms, food factories and other industries producing waste.

The methods employed in the treatment of sewage and effluent usually consists of a primary treatment by physical methods such as screening and sedimentation to remove settleable suspended matter and debris followed by a secondary treatment by an aerobic process to remove finely divided, emulsified and dissolved organic materials. The present invention relates to the secondary treatment of sewage and effluent.

The liquid entering the secondary treatment stage in a contemporary system contains organic matter in relatively low concentration. The liquid is treated by an aerobic process in which the organic matter is brought into close contact with air and the micro-organisms present. Part of the organic matter is oxidised by the micro-organisms to carbon dioxide and water, releasing energy, another part being converted into cellular material.

The aerobic biological process may be a percolating filter or a high rate biofiltration process. Alternatively it may consist of blowing air into reservoirs containing or through which the sewage is passed commonly called an activated sludge process.

A further aerobic biological process consists in circulating the liquid sewage around a system comprising a chamber of descending flow (termed downcomer) and a chamber of ascending flow (termed riser) communicating with each other at their upper and lower ends, an oxygen-containing gas being supplied to the sewage as it passes through the downcomer. Such a process is described in our British Patent Applications Nos. 23328/73 and 53921/73.

According to the present invention we provide a method for the treatment of liquid-borne sewage or effluent in which the liquid is circulated firstly through a tubular coil (hereinafter referred to as the compression coil) which is rotating about a substantially vertical axis, the pressure exerted on the liquid increasing continuously as the liquid passes from the innermost end of the coil to the outermost end of the coil, and secondly through a tubular coil (hereinafter referred to as the decompression coil) which is rotating about a substantially vertical axis, the pressure exerted on the liquid decreasing continuously as it passes from the outermost end of the coil to the innermost end of the coil, an oxygen-containing gas (as hereinafter defined) being supplied to the liquid as it passes through the compression coil.

Also according to the invention we provide an apparatus for the treatment of a liquid-borne sewage or effluent comprising a first tubular coil (referred to as the compression coil) a second tubular coil (referred to as the decompression coil), the two coils communicating with each other at their outer ends and optionally at their inner ends, means for rotating the two coils about the same substantially vertical axis, means for introducing the liquid-borne sewage or effluent into the inner end of the compression coil and circulating the liquid successively through the compression coil and the decompression coil, means for supplying an oxygen-containing gas (as hereinafter defined) to the liquid circulating in the compression coil, optionally, means connected to the inner end of the decompression coil for removing gas from the circulating liquid and means also connected to the inner end of the decompression coil for recirculating to the compression coil at least a portion of the sludge carried by the circulating liquid. Optionally, the apparatus is also provided with means for removing gas from the treated liquid.

In this specification the phrase oxygen-containing gas is to be understood to mean oxygen or any gaseous mixture, such as air, containing oxygen.

The tubes forming the compression and decompression coils may be of any convenient cross-sectional shape, for example they may be circular, semi-circular or rectangular. They may be disposed externally to each other, that is the coils may exist as separate structures, or they both may be disposed within a single structure. In the latter case the single structure is conveniently a cylindrical or other shaped tube divided into two portions by a partition. Alternatively one of the coils may be formed as one tube inside a larger tube in which case the inner tube would be the compression tube with the outer space forming the decompression tube or vice versa.

In the invention the compression and decompression coils are conveniently rotated by means of a suitable motor about a vertical axis. Optionally, also, the liquid-borne sewage or effluent is pumped into the inner end of the rotating compression coil. While the liquid is circulating in the rotating compression coil, an oxygen-containing gas at atmospheric pressure is injected into the liquid and, because of the centrifugal forces generated in the rotating coil, the liquid is compressed causing a reduction in the size of the oxygen-containing gas bubbles and ultimately, if the speed of rotation is sufficiently high, the dissolution of the gas. This achieves an efficient transfer of oxygen into the circulating liquid and the aerobic process takes place efficiently.

When the liquid enters the rotating decompression coil, the bubbles reappear and gradually increase in size and aid the circulation of the liquid. Subsequently the liquid may be degassified, for example by means of vacuum, and sludge separated for return, with the liquid to be treated, to the compression coil. Advantageously, the sludge is separated by means of a centrifugal separator mounted on the same shaft as the coils.

This invention will now be described with reference to the accompanying drawings in which:

FIG. 1 shows, diagrammatically, a vertical section through a typical invention according to the invention, FIG. 2 shows, also diagrammatically, a plan view of the apparatus shown in FIG. 1, FIG. 3 shows, also diagrammatically, a variation of the apparatus shown in FIG. 1 and FIG. 2 in which liquid can be circulated directly from the decompression coil to the compression coil, and FIG. 4 shows, also diagrammatically, a further variation of the apparatus shown in FIG. 1 and FIG. 2.

Referring to the drawings, two spirally wound tubular coils, a compression coil 2 and a decompression coil 3 which communicate with each other at 11, are mounted on a common hollow drive shaft 1 provided with a concentric inner tube. The shaft which runs in bearings 4 is driven by an electric motor (not shown). Both the hollow drive shaft and the concentric inner tube are partitioned off at 17 to provide separate chambers on opposed sides of the partition.

The lower end of the concentric inner tube serves to convey the untreated liquid from an inlet 5 into a connecting tube 18 which, in turn, conveys the liquid to the innermost end of the compression coil 2.

Gas may be admitted as required to 10 from an inlet 7 to provide a means of circulation of the liquid through the coils.

The section of the concentric inner tube above the partition 17 serves to convey liquid and gas, via connecting tube 19 from the innermost end of the decompression coil to an outlet 8.

Oxygen-containing gas is introduced through an inlet conduit 6, the hollow shaft and a connecting tube into the compression coil at 9.

Means (not shown) is provided external to the apparatus for gas disengagement and for recycling a controlled portion of the treated liquid to the inlet 5.

The apparatus shown in FIG. 3 is provided with an annular chamber 12 which connects the inner ends of the compression coil and decompression coil allowing a portion of treated liquid to be recirculated from the decompression coil to the compression coil. The gas is discharged with the outgoing flow of treated liquid to the disengagement vessel (not shown) external to the apparatus where the gas is separated from the liquid.

FIG. 4 shows a further variation in which the treated sewage is subjected to a pressure below atmospheric pressure before being discharged from the apparatus. The inner ends of the compression and decompression coils are connected to an annular chamber 13 to provide means for recirculation and gas disengagement, the chamber being vented at 20. The flow of sewage from the chamber is passed through the degassing coils 14 and 15. Since the pressure in the annular chamber will be substantially atmospheric, the pressure at the inner ends of the coils will be below atmospheric. The upper internal tube is used in this case to provide a means of withdrawing gas released under the conditions of reduced pressure and allowing sewage to flow through the coils to the point of discharge to the collecting trough 16.

The invention will be further described with reference to the following Examples:

EXAMPLE 1

Calculations reveal that a pilot plant of about 2m³ capacity would be capable of treating 1 to 2m³/hr of sewage. Such a plant would consist of two spirally wound coils of about 4.5 m outside diameter each containing about 140 m of 100 mm diameter pipe, rotating at a speed of about 240 revs/min. Allowing a velocity of 1.5m/sec. the cycle time would be about 3 mins. The pressure at the outer ends of the compression and decompression coils would be about 150 m head of water but, of course, this could be adjusted by altering the speed of rotation.

EXAMPLE 2

An apparatus according to the invention of 700 ml capacity was constructed comprising two spirally wound coils consisting of a total of 25m of 6 mm bore tubing. The coils were rotated at a speed of 1200 RPM. The pressure at the outer ends of the compression and decompression coils were equivalent to a head of water of 32 m. The compression coil was fed with a solution of glucose with a BOD of 500 mg/liter at a rate of 175 ml/hour. Air was supplied to the apparatus at a predetermined controlled rate and 85% of the soluble BOD was removed from the influent.

On reducing the speed of rotation to 600 RPM the pressure equivalent was reduced to 8 m of water and the BOD removal efficiency reduced to 50%.

We claim:

1. A method for the treatment of liquid-borne sewage or effluent in which the liquid is circulated firstly through a tubular coil, the compression coil, which is rotating about a substantially vertical axis, the pressure exerted on the liquid increasing continuously as the liquid passes from the innermost end of the coil to the outermost end of the coil, and secondly through a tubular coil, the decompression coil, which is rotating about a substantially vertical axis, the pressure exerted on the liquid decreasing continuously as it passes from the outermost end of the coil to the innermost end of the coil, an oxygen-containing gas being supplied to the liquid as it passes through the compression coil to flow co-currently with the liquid.

2. An apparatus for the treatment of liquid-borne sewage or effluent comprising a first tubular coil, the compression coil, a second tubular coil, the decompression coil, the two coils communicating with each other at their outer ends, means for rotating the two coils about the same substantially vertical axis, means for introducing the liquid-borne sewage or effluent into the inner end of the compression coil and circulating the liquid successively through the compression coil and the decompression coil, means for supplying an oxygen-containing gas to the liquid circulating in the compression coil to flow co-currently therewith, and means connected to the inner end of the decompression coil for recirculating to the compression coil at least a portion of the sludge carried by the circulating liquid.

3. An apparatus as claimed in claim 2 in which the compression coil and the decompression coil communicate with each other at their inner ends.

4. An apparatus as claimed in claim 2 provided with means connected to the inner end of the decompression coil for removing gas from the circulating liquid.

5. An apparatus as claimed in claim 2 provided with means for removing gas from the treated liquid.

6. An apparatus as claimed in claim 5 in which the means for removing gas from the treated liquid is a vacuum means.

7. An apparatus as claimed in claim 2 provided with a centrifugal separator connected to the inner end of the decompression coil for separating sludge for return to the compression coil.

* * * * *